July 2, 1957   R. H. MARCHAL ET AL   2,797,548
THRUST SPOILER FOR PROPELLING NOZZLES
Filed Feb. 6, 1953   5 Sheets-Sheet 1
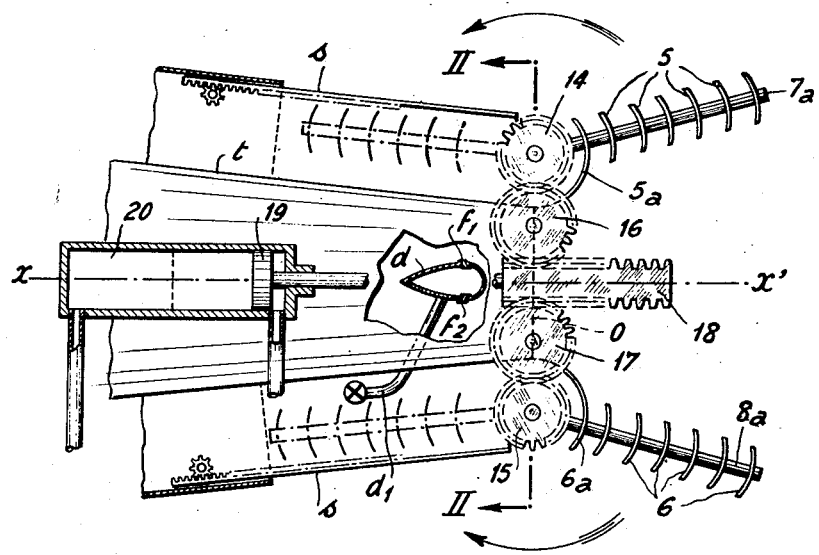
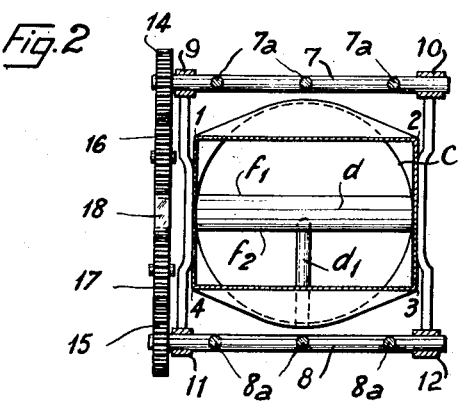
INVENTORS
Raymond H. Marchal
François M. L. Maunoury
Henri Jurinette
Marcel Kadosch
Jean A. Bertin
By Watson, Cole, Grindle & Watson
ATTORNEYS July 2, 1957  R. H. MARCHAL ET AL  2,797,548
THRUST SPOILER FOR PROPELLING NOZZLES
Filed Feb. 6, 1953  5 Sheets-Sheet 2
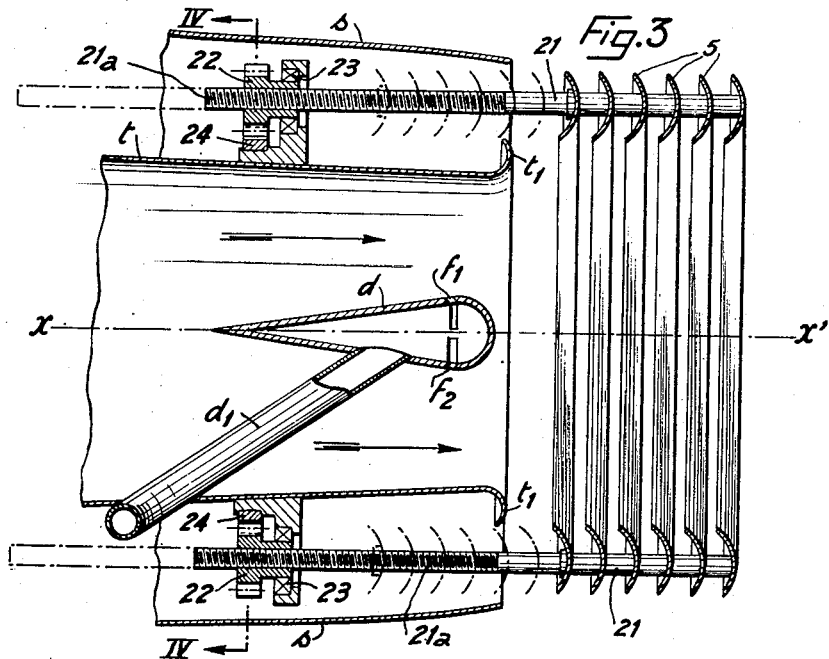
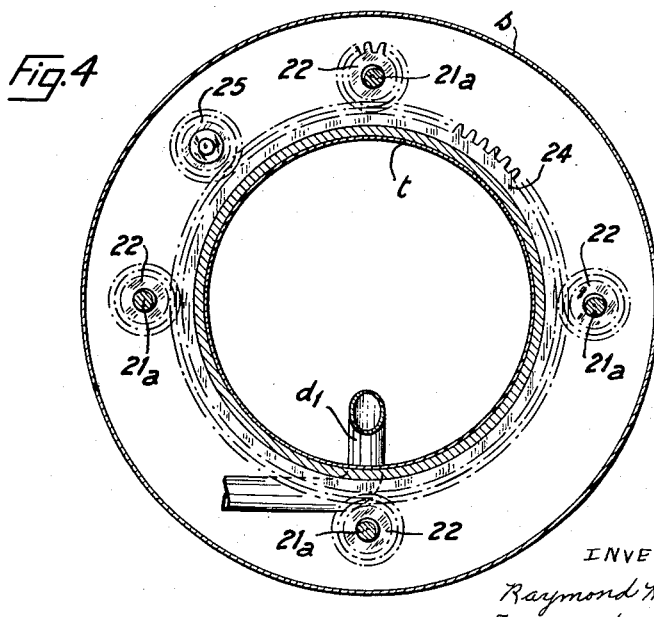
INVENTORS
Raymond H. Marchal
François M. L. Maunoury
Henri Turinetti
Marcel Kadosch
Jean H. Bertin
By Watson, Cole, Grindle & Watson
ATTORNEYS July 2, 1957 R. H. MARCHAL ET AL 2,797,548
THRUST SPOILER FOR PROPELLING NOZZLES
Filed Feb. 6, 1953 5 Sheets-Sheet 3
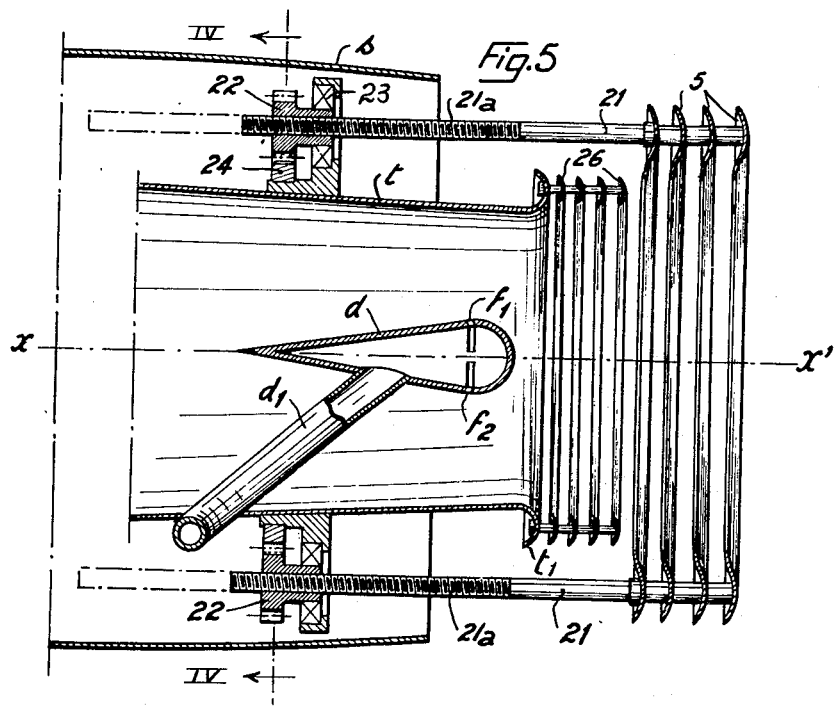
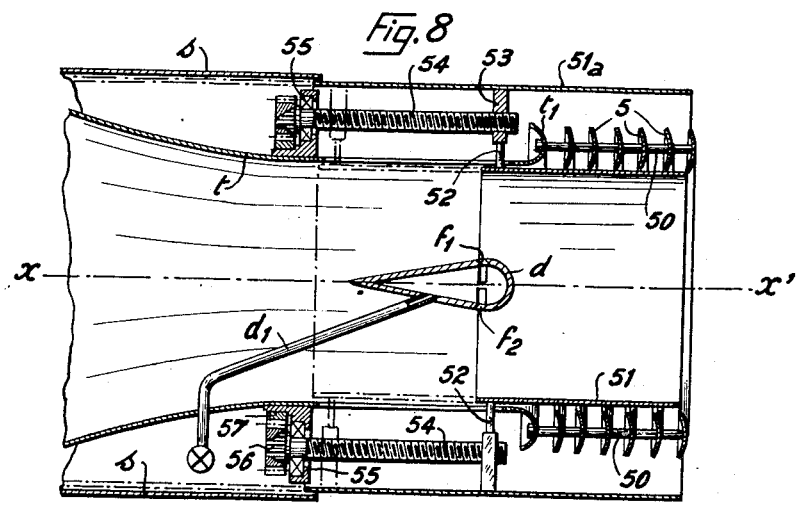
INVENTORS
Raymond H. Marchal
Francois M. L. Maunoury
Henri Turinetti
Marcel Kadosch
Jean H. Bertin
By Watson, Cole, Grindle & Watson
ATTORNEYS INVENTORS
Raymond H. Marchal
François M. L. Maunoury
Henri Turinetti
Marcel Kadosch
Jean H. Bertin
By Watson, Cole, Grindle & Watson
ATTORNEYS July 2, 1957 R. H. MARCHAL ET AL 2,797,548
THRUST SPOILER FOR PROPELLING NOZZLES
Filed Feb. 6, 1953 5 Sheets-Sheet 5
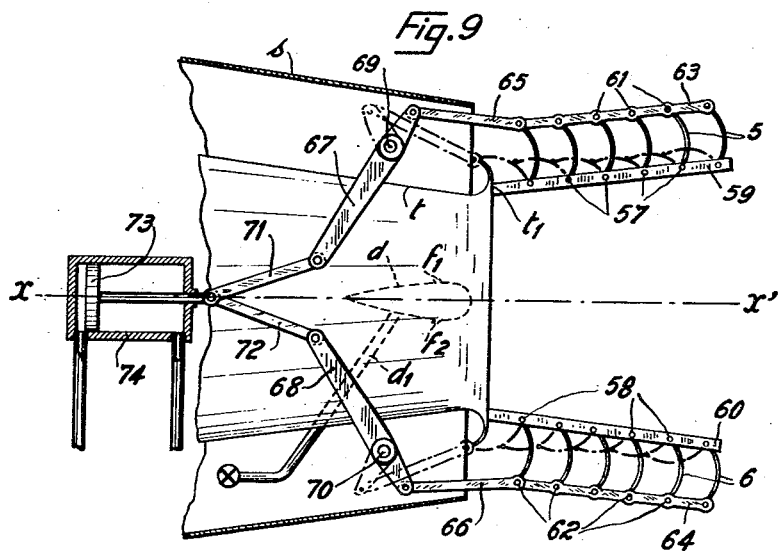
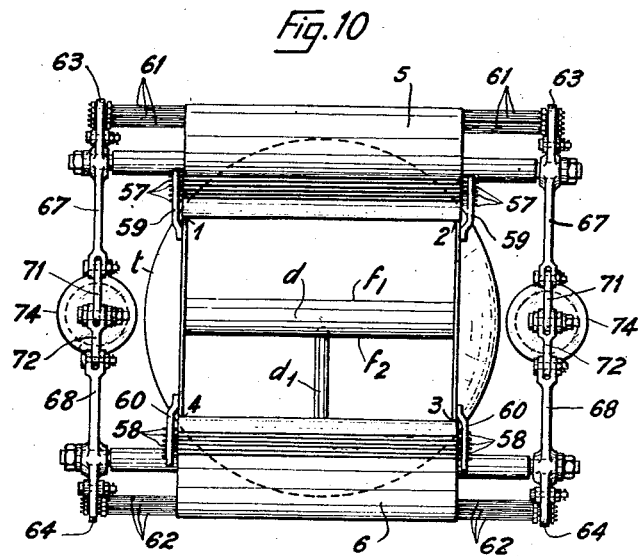
INVENTORS
Raymond H. Marchal
Francois M. L. Maunoury
Henri Turinetti
Marcel Kadosch
Jean K. Bertin
By Watson, Cole, Grindle & Watson
ATTORNEYS

# United States Patent Office 2,797,548
Patented July 2, 1957

2,797,548

THRUST SPOILER FOR PROPELLING NOZZLES

Raymond H. Marchal, François M. L. Maunoury, Henri Turinetti, and Marcel Kadosch, Paris, and Jean H. Bertin, Neuilly-sur-Seine, France, assignors to Societe Nationale d'Etude et de Construction de Moteurs d'Aviation, Paris, France, a French company Application February 6, 1953, Serial No. 335,442

Claims priority, application France February 16, 1952

3 Claims. (Cl. 60—35.55)

In the specification of our copending patent application Serial No. 396,994, filed December 8, 1953, which is a divisional application of our co-pending patent application Serial No. 229,772, filed June 4, 1951, we have described a device for deflecting an axially flowing jet formed by a propelling nozzle of a jet propulsion unit, comprising a plurality of guide vanes defining passages extending laterally of said axially flowing jet and opening into the atmosphere, said passages having inner ends facing said axially flowing jet and spaced along the path thereof, controllable means being provided for urging said jet towards said inner ends and into said passages, whereby said jet issues at a substantial angle with respect to the axis of said nozzle.

In order to obtain the most efficient action of the set of guide vanes, the latter should be so positioned that their inner ends are just adjacent to the boundary layer of the jet, so that the least action of the controllable means will immediately render these vanes operative for effecting deflection, e. g. for thrust spoiling purposes. If the guide vanes are positioned closer to the axis of the nozzle, their inner ends will intercept part of the jet and this part will be deflected even when no deflection is desired, thus causing a decrease in the propelling thrust and in the efficiency of the engine and an overstrain of the vanes. If, on the other hand, the guide vanes are positioned further from the axis, a greater deflecting action will be required from the controllable means and there will be an appreciable lag before the vanes become operative. Now it will be appreciated that a correct positioning of the guide vanes is a rather difficult task, the more so as the outline of the issuing jet—and more particularly its divergence—varies with its velocity, i. e. with the rate of operation of the engine. It is therefore likely that the vanes will be either too near or too far, according to the variable conditions of operation.

Moreover, as the outer ends of the guide vanes are within ambient air, they may exert a scooping action on the air, due to the relative velocity, and produce minor air jets issuing laterally into the propelling jet and upsetting the flow of the latter. Furthermore, these guide vanes form a detrimental wake as ambient air is "scraped" by their outer ends.

The object of this invention is to overcome these various drawbacks and ensure a proper action of the guide vanes.

According to the invention, there is provided a device for deflecting an axially flowing jet issuing from a propelling nozzle forming the tail end of a jet propulsion unit, comprising a set of concealable guide vanes defining, when displayed, passages extending laterally of the axially flowing jet and opening into the atmosphere, said passages having inner ends facing said axially flowing jet and spaced along the path thereof, means being provided for alternatively concealing or displaying said vanes, controllable means associated with said nozzle being adapted to urge said jet towards said inner ends and into said passages, whereby said jet issues at a substantial angle with respect to the axis of said nozzle, said set of vanes being positioned, at least when displayed, downstream of said nozzle, beyond said tail end.

Thus, the above drawbacks are completely overcome during normal operation of the engine (undeflected jet) since the vanes are then concealed, and moreover, as deflection or thrust spoiling is to be effected at a known, reduced rate of operation of the engine, it is possible to determine the position of the vanes so that they will be just adjacent to the still undeflected jet, at that rate of operation.

The invention is illustrated by way of example in the accompanying drawings in which:

Fig. 1 is an elevational view, partly broken away of the ejection end of a nozzle formed with an arrangement of guide vanes which can be retracted by a pivoting movement.

Fig. 2 is an axial section of Fig. 1, taken along the line II—II.

Fig. 3 is a view in axial section of a nozzle equipped with vanes which can be retracted by translation.

Fig. 4 is a section on the line IV—IV of Figs. 3 and 5.

Fig. 5 is an axial section of a third embodiment.

Fig. 8 is an axial section of a fifth embodiment.

Fig. 9 is a side elevation of a sixth embodiment of the invention.

Fig. 10 is an end view thereof.

Figure 6:
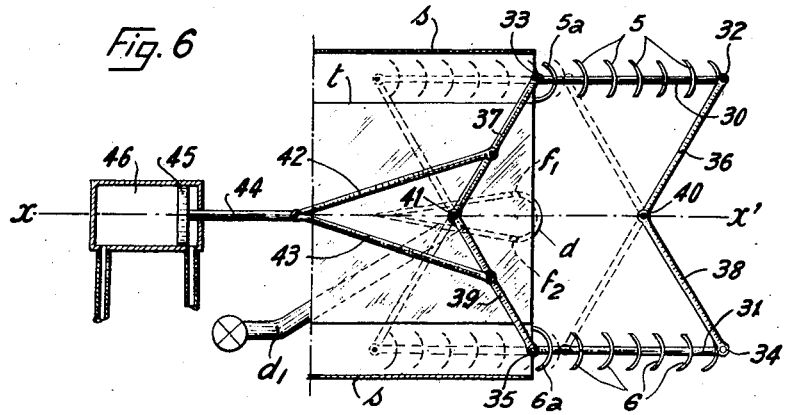
Fig. 6 is a view in side elevation of a fourth embodiment.

In the embodiment shown in Figures 1 and 2, a propelling nozzle $t$ expels a gas jet to atmosphere by way of its freely open orifice $o$, the axis of said jet coinciding, in normal operation, with the axis $xx'$ of the nozzle. The latter comprises upstream (to the left of Figure 1) a circular section as indicated by the circle $c$ drawn in Fig. 2. On the downstream side, its shape changes progressively in such manner that the discharge orifice $o$ becomes a rectangle (rectangle 1, 2, 3, 4, Figure 2). Inside the nozzle and in the vicinity of the transverse plane containing the discharge orifice $o$, there is located a member $d$ adapted, when it is rendered operative, to intercept a part of the flowing fluid and thus to initiate the deflection, i. e. to urge the jet away from the axis of the nozzle. The fluid intercepting means for initiating the deflection may be a controllable fluid or physical obstacle as described in the above-mentioned application Serial No. 396,994.

In the example illustrated, this means is formed by a tube of aerofoil section which extends parallel to the longer sides 1—2, 3—4 of the discharge orifice, in the central plane of the nozzle. This tube, which may be supplied by a pipe $d_1$ with air under pressure (taken for example from the air compressor of the jet unit) when it is desired to deviate the jet propulsion, comprises along its length two symmetrical slots $f_1$, $f_2$, which thus extend parallel to the longer sides 1—2, 3—4 of the discharge orifice.

Two shafts 7—8, journalled in the bearings 9, 10, 11, 12 are disposed externally of the nozzle and parallel to said longer sides. By means of rods 7a—8a, these shafts each carry a set of vanes 5 and 6, respectively, so that upon a pivoting movement of the said shafts, the sets of vanes 5—6 may be placed either in the operative position as indicated in full lines in Fig. 1, or in the retracted or rest position as indicated in broken lines. The vanes of each set have a curvature such that in the operative position, they deviate the gases which pass between them by the required angle. In each set, the vane $5a$ or $5b$ respectively, which is closest to the outlet of the nozzle orifice, has in addition a length and a curvature such that when the sets of vanes are in the operative position, these vanes $5a$, $6a$ are adapted to bear against the longer sides of the discharge orifice, thus tangentially extending the walls of the nozzle adjacent these longer sides.

When the tube $d$ is not supplied with compressed air and when the vanes are disposed in the rest position indicated in dotted lines, there is nothing to oppose the flow of the jet along the axis of the nozzle, the tube $d$ being suitably tapered, taking into account the flow velocity and having in addition a small maximum cross-section in order to apply minimum resistance to the flow, while the vanes 5, 6 are completely outside the path of the gases, thus avoiding any loss of thrust, which is of importance for an aircraft having a high performance. On the contrary, when the tube $d$ is supplied with compressed air, after having placed the sets in the operative position, the jets of compressed air which escape through the longitudinal slots $f_1$, $f_2$ of this tube (which slots are preferably slightly inclined with the incline directed upstream) are adapted to intercept the parts of the flow adjacent the central plane, so that the jet is urged towards and tends to adhere to the first vanes $5a$ and $6a$ extending the nozzle, and is thus deviated on two sides of the central plane of the nozzle containing the axis of the tube $d$. The sets of vanes 5—6 extend this deviation beyond the point where it would stop if the vanes did not exist. By giving these vanes a suitable curvature, it is possible to obtain any desired angle for the deviation, for example, an angle of 180°, so that in a jet propulsion unit, the jet is completely returned and may produce an extremely efficient braking without it being necessary to reduce the operating speed of the jet propulsion unit, this being favourable for an immediate restoration of the thrust after braking, if this is necessary.

It is not necessary that the obstruction to the flow created by the auxiliary jets escaping by way of the slots $f_1$, $f_2$ should intercept a large part of the section open to the flow in the nozzle. Generally speaking, the narrowing of the section introduced by these auxiliary jets which constitute fluid obstacles will be 30% (or less).

The pivoting of the shafts 7—8 may be controlled in any suitable manner. In the drawing, there have been shown pinions 14 and 15 keyed to one of the ends of these shafts and engaging with two intermediate pinions 16 and 17 which mesh with a central rack 18. The latter may be displaced by a hydraulic motor comprising a double-acting piston 19 sliding in a cylinder 20.

It is to be noted, that in their operative position, the vanes are outside a divergent cone which the jet forms when it is not deviated. This renders it possible to avoid the thrust of gases on the vanes when it is desired to operate them, since it is sufficient to place the vanes in the operative position before supplying the element $d$ in order to initiate the deviation and conversely to precede the retracting operation for stopping the deviation by shutting-off the supply of air to the element $d$.

If use is made, for example, of a device for braking a jet aircraft during the operations preceding the landing, the pilot will position the vanes in the operative position as soon as he considers it advisable to apply a braking action. From this moment, he will be able to initiate the deviation of the jet by supplying the tubes $d$ as soon as he wishes in order instantaneously to adjust his angle of descent or his speed. If he sees that the landing operation is misjudged and there is a danger of over-running the boundary of the airfield, it will be possible for him, by shutting off the supply to the element $d$, to make use instantaneously of a thrust which is only slightly different from the maximum thrust, and this will ensure absolute safety for him. Moreover, he may retract the sets immediately after having stopped the deviation in order once again to obtain the full thrust.

In order to screen the vanes from the action of relative wind outside the periods of deviation, there are provided on the fairing of the aircraft, movable surfaces $s$ which mask the retracted vanes.

In the modified form shown in Figures 3 and 4, the retraction of the set of vanes is obtained by a translatory movement.

The circular nozzle $t$ having an axis $xx'$ and terminated by a convex and tangential deviating edge $t_1$ is coupled to a set of annular vanes 5 with the same axis $xx'$, supported by four rods 21. These rods carry a threaded portion $21a$ cooperating with nuts 22. These nuts are held in a well-defined position along their axis by means of rollers such as 23, for example, so that their rotation causes the displacement of the rods along their axis. The four nuts carry a toothing on their periphery and are driven and synchronised by a toothed ring 24 on the axis $xx'$. This ring is set in rotation by a pinion 25 driven by any suitable motor.

Outside the periods of deviation of the jet, the set of vanes is retracted into the position in broken lines inside the fairing of the aircraft and the element $d$ is not supplied with air. When it is desired to deviate the jet by rotation of the pinion 25, the set of vanes is positioned in the fully "out" position indicated in full lines or in an intermediate position and then the element $d$ is supplied in such manner that a more or less large quantity of gas penetrates into these vanes and is deviated, the effect of which is to modify the thrust of the jet unit, and in fact to reverse it. In this example, the hollow member $d$ is a body of revolution about the axis $xx'$ and the slot $f$ thereof is circular.

The embodiment according to Fig. 5 only differs from the previous one by the fact that only a part of the vanes can be moved by translation. The set of vanes 5 may be displaced as before, while the set 26 placed at the immediate outlet of the nozzle remains fixed.

The operation is identical with the previous arrangement, but a very rapid deviation of the jet (and thus a very rapid braking of the aircraft propelled by reaction), may be obtained partially by the fixed vanes, since this deviation is no longer combined with a mechanical displacement.

In normal operation, the loss of thrust due to the "scraping" of the divergent jet by the fixed vanes 26 is avoided, because the first fixed vanes may be placed outside the jet while remaining relatively near to the outlet orifice. The movable vanes 5 disposed further away preferably have a larger internal diameter in order to be clear of the jet when it is not deviated, this facilitating the retraction thereof if first of all the deviation is stopped by cutting-off the supply of air to the deviating member $d$.

Figure 7:
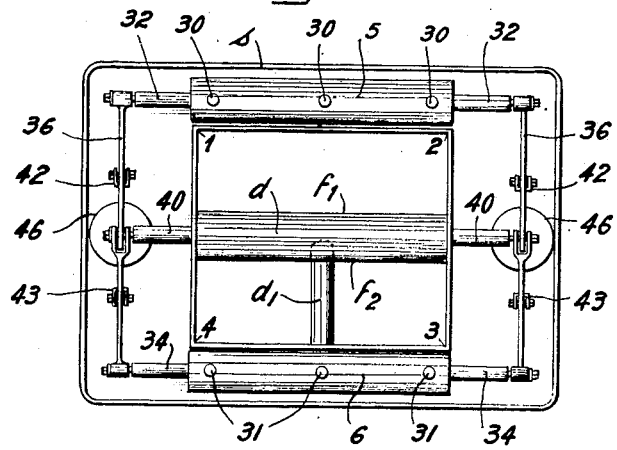
Fig. 7 is an end view thereof.

In the modification according to Figures 6 and 7, the translatory movement of the vanes is obtained by a pivoted parallelogram control.

As in the case of Figures 1 and 2, the nozzle $t$ opens at the rear end through a rectangular orifice section 1, 2, 3, 4 having free edges. Externally of the nozzle and parallel to the two longer sides of this orifice, two sets of vanes 5 and 6 are symmetrically arranged. The rods 30 and 31 parallel to the axis $xx'$ of the nozzle, which connect the vanes of these sets, are articulated by means of pivots 32, 33 and 34, 35 respectively, to parallel levers 36, 37 and 38, 39 respectively, which in turn are articulated about fixed pivots 40, 41 at each side of the nozzle.

It is obvious that in this arrangement, the pivoting of the levers 36, 37 on the one hand and that of the levers 38, 39 on the other hand about fixed pivots 40, 41, enables the vanes to move by a translatory movement from the retracted position shown in broken lines to the operative position shown in full lines. This pivoting movement is controlled from each side of the nozzle by a pair of rods 42, 43 pivoted at one end on the levers 37, 39 and at the other end on the rod 44 of a control piston 45 which is movable in a cylinder 46 and which can receive a fluid under pressure at one or other of its ends.

Each of the sets of vanes comprises a surface $5a$ or $6a$, which in the operative position of these sets, is adapted to be brought into line tangentially with the corresponding wall of the nozzle, the deviated jet adhering to said surface.

In the modification according to Figure 8, the set of vanes 5 of annular form and with the same axis as the nozzle $t$ which it follows, is permanently fixed by rods 50 on the tangential convex edge $t_1$ at the end of the nozzle. Disposed in the latter is a cylindrical sleeve 51 with the same axis $xx'$ as the nozzle and with an external diameter slightly smaller than the diameter of the nozzle so as to be capable of sliding in the latter. This sleeve carries a certain number of fingers 52 which extend out of the nozzle through longitudinal slots in the latter, it being possible for the said fingers to be displaced in said slots. These fingers 52 each carry a nut 53 cooperating with a threaded rod 54. These rods 54 may turn in bearings 55 fast with the external wall of the nozzle and are given a turning movement by pinions 56 meshing with a toothed ring 57 capable of turning about the axis of the nozzle, the rotation of said toothed ring being adapted to be controlled by a pinion similar to the pinion 25 of Figure 4.

Under normal running conditions, without deviation of the jet, that is to say, when the hollow body $d$ of revolution about the axis $xx'$ is not supplied with air, the sleeve 51 is placed in the position shown in full lines, in which it extends the nozzle and covers the vanes.

On the other hand, when it is desired to effect a deviation, the sleeve 51 is caused to re-enter the nozzle to a greater or lesser extent, as shown in broken lines, in order to uncover a greater or less number of vanes.

An external sleeve 51a which is also fast with the nuts 53, may be provided in order to prevent the relative wind acting on the vanes outside the deviation periods. This external sleeve 51a is adapted to be retracted beneath the fairing $s$ of the aircraft when the vanes are uncovered to effect a deviation.

In the modification of Figures 9 and 10, the ducts between the vanes are adapted to be closed by displacements of these vanes, each of which is arranged to be movable.

The nozzle $t$ is terminated by a rectangular orifice 1, 2, 3, 4 along the longer sides 1—2, 3—4, of which are provided the convex edges $t_1$ extending the walls of the nozzle tangentially adjacent these longer sides. Disposed parallel to these longer sides are two sets of vanes 5—6.

On its longer side close to the jet, each of these vanes comprises two opposed pivots 57 and 58 respectively, by which the vane is pivoted on fixed arms 59 and 60 respectively fast with the nozzle.

On their edge opposite the jet, the vanes are also articulated by pivots 61 and 62 respectively on rods 63, 64. The pivots are arranged in such manner that each assembly constituted by two adjacent vanes, by the part of the arms 59 or 60 disposed between these vanes and by the part of the rod 63 or 64 also located between these vanes, forms a pivoted parallelogram. The rods 63, 64 are linked by small rods 65, 66 to levers 67, 68 adapted to pivot about fixed points 69, 70, the said levers being controlled by means of links 71, 72 by pistons 73 movable in hydraulic cylinders 74.

It will be seen that by displacing these pistons, it is possible either to place the vanes in the position shown in full lines in Figure 9, in which the said vanes are spaced from one another, thus opening between them ducts for the passage of gases, or on the other hand to seat the vanes one upon the other in the position shown in broken lines so that the gases are unable to pass between these vanes.

It would also be possible to make the vanes movable by translation relatively to one another on suitable guides so as to be able to bring them close together in order to reduce the spaces or to close them.

It is expedient to note that the embodiments according to Figures 3–8 enable either all or only a part of the vanes to be rendered operative and consequently the deviating means to be adapted to the operational parameters.

A similar adaptation is possible in the case of Figures 9 and 10 by the vanes being pivoted to a greater or lesser amount in order to vary the flow section of the ducts between the said vanes.

What we claim is:

1. In a jet propulsion unit having a rearwardly facing propulsive nozzle designed for producing a jet issuing axially therefrom, a device for deflecting said jet from the axis of said nozzle comprising a concealable set of guide vanes movable relatively to said nozzle and arranged, when exposed, to define successive, laterally extending passages for the jet, said passages opening into the atmosphere, a casing extending about said nozzle and constructed to accommodate and conceal said set of vanes, and controllable means for displacing said set of vanes relatively to said nozzle, in and out of said casing.

2. The device of claim 1 wherein the set of vanes is movable parallel to the axis of the nozzle.

3. The device of claim 1 wherein the laterally extending passages defined by the displaced vanes have inner ends facing generally towards the axis of the nozzle and lying at a distance therefrom greater than that of the end periphery of said nozzle.

References Cited in the file of this patent

UNITED STATES PATENTS

| | | |
|---|---|---|
| 2,418,488 | Thompson | Apr. 18, 1947 |
| 2,479,777 | Price | Aug. 23, 1949 |
| 2,483,401 | Cole | Oct. 4, 1949 |
| 2,620,622 | Lundberg | Dec. 9, 1952 |
| 2,620,623 | Imbert | Dec. 9, 1952 |
| 2,637,164 | Robson et al. | May 5, 1953 |
| 2,681,548 | Kappus | June 22, 1954 |

FOREIGN PATENTS

| | | |
|---|---|---|
| 1,020,287 | France | Nov. 12, 1952 |